(12) United States Patent
Seo et al.

(10) Patent No.: US 7,724,722 B2
(45) Date of Patent: May 25, 2010

(54) SYSTEM AND METHOD FOR TRANSMITTING UPLINK CONTROL INFORMATION IN AN OFDMA COMMUNICATION SYSTEM

(75) Inventors: Hee-Sang Seo, Seoul (KR); Seung-Joo Maeng, Seongnam-si (KR); Myung-Kwang Byun, Suwon-si (KR); Jae-Ho Jeon, Seongnam-si (KR); Soon-Young Yoon, Seoul (KR); Jung-Won Kim, Seoul (KR); Pan-Yuh Joo, Yongin-si (KR); Jae-Weon Cho, Suwon-si (KR)

(73) Assignee: Samsung Electronics Co., Ltd. (KR)

( * ) Notice: Subject to any disclaimer, the term of this patent is extended or adjusted under 35 U.S.C. 154(b) by 1068 days.

(21) Appl. No.: 11/173,668

(22) Filed: Jul. 1, 2005

(65) Prior Publication Data

US 2006/0013185 A1 Jan. 19, 2006

(30) Foreign Application Priority Data

Jul. 1, 2004 (KR) ................ 10-2004-0051315

(51) Int. Cl.
*H04B 7/208* (2006.01)
(52) U.S. Cl. ............... 370/344; 370/343; 455/436; 455/437; 455/438; 455/442; 455/443
(58) Field of Classification Search ......... 455/436–444, 455/450–452; 370/343–344
See application file for complete search history.

(56) References Cited

U.S. PATENT DOCUMENTS

| | | | |
|---|---|---|---|
| 5,787,346 A * | 7/1998 | Iseyama | ............... 455/439 |
| 6,038,450 A * | 3/2000 | Brink et al. | ............... 455/442 |
| 6,694,147 B1 | 2/2004 | Viswanath et al. | |
| 2001/0008523 A1 * | 7/2001 | Song | ............... 370/335 |
| 2002/0183064 A1 * | 12/2002 | Gopalakrishnan et al. | ... 455/452 |
| 2003/0095532 A1 * | 5/2003 | Kim et al. | ............... 370/342 |

(Continued)

FOREIGN PATENT DOCUMENTS

GB 2 301 687 12/1996

(Continued)

OTHER PUBLICATIONS

3rd Generation Partnership Project; Technical Specificaiton Group Radio Access Network; Feasibility Study for OFDM for UTRAN Enhancement;.

(Continued)

*Primary Examiner*—Patrick N Edouard
*Assistant Examiner*—David Wang
(74) *Attorney, Agent, or Firm*—The Farrell Law Firm, LLP

(57) ABSTRACT

A method for transmitting uplink control information in a communication system using an orthogonal frequency division multiple access (OFDMA) scheme is provided. A mobile station (MS) selects a target anchor base station (BS) with which the MS desires to communicate through a fast feedback channel, and transmits a codeword allocated to the selected target anchor BS to a current anchor BS. Upon receiving the codeword, transmitting to the MS, by the anchor BS, fast feedback channel allocation information for the selected BS corresponding to the received codeword. The MS switches to a new anchor BS corresponding to the fast feedback channel allocation information.

16 Claims, 6 Drawing Sheets

U.S. PATENT DOCUMENTS

| | | | |
|---|---|---|---|
| 2003/0112744 A1* | 6/2003 | Baum et al. | 370/206 |
| 2003/0123559 A1* | 7/2003 | Classon et al. | 375/260 |
| 2004/0062192 A1 | 4/2004 | Liu et al. | |
| 2004/0066772 A1* | 4/2004 | Moon et al. | 370/342 |
| 2004/0114552 A1* | 6/2004 | Lim et al. | 370/324 |
| 2004/0219917 A1* | 11/2004 | Love et al. | 455/436 |
| 2005/0085265 A1 | 4/2005 | Laroia et al. | |
| 2007/0263735 A1* | 11/2007 | Tong et al. | 375/260 |

FOREIGN PATENT DOCUMENTS

| | | |
|---|---|---|
| JP | 2003-046482 | 2/2003 |
| KR | 102001002808 | 4/2001 |
| KR | 102004002849 | 4/2004 |
| RU | 2 142 672 | 12/1999 |
| WO | WO 99/59253 | 11/1999 |
| WO | WO 02/082666 | 10/2002 |
| WO | WO 03/044990 | 5/2003 |

OTHER PUBLICATIONS (Release 6), 3GPP TR 25.892 V1.1.1, May 2004.

Motorola, Samsung and Lucent: HS-DPCCH Power Control in Soft-Handoff, TSG-RAN1#29 TSGR1-02-1352, Nov. 5, 2002.

Samsung: Harmonization Impact on TFCI and New Optimal Coding for Extended TFCI with Almost No Complexity Increase,. TSG-RAN Working Group 1 meeting #5 TSGR(99)913, Jul. 13, 1999.

Philips: ARQ for Multiple Data Streams in HSDPA, TSG RAN WG1 ad hoc TSGR1(01)1057, Nov. 5, 2001.

* cited by examiner

| CODEWORD | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| A0 | 0 | 1 | 2 | 3 | 4 | 5 | 6 | 7 | 0 | 1 | 2 | 3 | 4 | 5 | 6 | 7 |
| A1 | 0 | 1 | 2 | 3 | 4 | 5 | 6 | 7 | 1 | 2 | 3 | 4 | 5 | 6 | 7 | 0 |
| A2 | 0 | 1 | 2 | 3 | 4 | 5 | 6 | 7 | 2 | 3 | 4 | 5 | 6 | 7 | 0 | 1 |
| A3 | 0 | 1 | 2 | 3 | 4 | 5 | 6 | 7 | 3 | 4 | 5 | 6 | 7 | 0 | 1 | 2 |
| A4 | 0 | 1 | 2 | 3 | 4 | 5 | 6 | 7 | 4 | 5 | 6 | 7 | 0 | 1 | 2 | 3 |
| A5 | 0 | 1 | 2 | 3 | 4 | 5 | 6 | 7 | 5 | 6 | 7 | 0 | 1 | 2 | 3 | 4 |
| CODEWORD | 16 | 17 | 18 | 19 | 20 | 21 | 22 | 23 | 24 | 25 | 26 | 27 | 28 | 29 | 30 | 31 |
| A0 | 4 | 5 | 6 | 7 | 0 | 1 | 2 | 3 | 4 | 5 | 6 | 7 | 0 | 1 | 2 | 3 |
| A1 | 7 | 0 | 1 | 2 | 3 | 4 | 5 | 6 | 6 | 7 | 0 | 1 | 2 | 3 | 4 | 5 |
| A2 | 2 | 3 | 4 | 5 | 6 | 7 | 0 | 1 | 0 | 1 | 2 | 3 | 4 | 5 | 6 | 7 |
| A3 | 5 | 6 | 7 | 0 | 1 | 2 | 3 | 4 | 2 | 3 | 4 | 5 | 6 | 7 | 0 | 1 |
| A4 | 1 | 2 | 3 | 4 | 5 | 6 | 7 | 0 | 5 | 6 | 7 | 0 | 1 | 2 | 3 | 4 |
| A5 | 6 | 7 | 0 | 1 | 2 | 3 | 4 | 5 | 7 | 0 | 1 | 2 | 3 | 4 | 5 | 6 |

FIG.6

| CODEWORD | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| A0 | 0 | 1 | 2 | 3 | 4 | 5 | 6 | 7 | 2 | 3 | 0 | 1 | 6 | 7 | 4 | 5 |
| A1 | 0 | 1 | 2 | 3 | 4 | 5 | 6 | 7 | 4 | 5 | 6 | 7 | 0 | 1 | 2 | 3 |
| A2 | 0 | 1 | 2 | 3 | 4 | 5 | 6 | 7 | 3 | 2 | 1 | 0 | 7 | 6 | 5 | 4 |
| A3 | 0 | 1 | 2 | 3 | 4 | 5 | 6 | 7 | 6 | 7 | 4 | 5 | 2 | 3 | 0 | 1 |
| A4 | 0 | 1 | 2 | 3 | 4 | 5 | 6 | 7 | 7 | 6 | 5 | 4 | 3 | 2 | 1 | 0 |
| A5 | 0 | 1 | 2 | 3 | 4 | 5 | 6 | 7 | 5 | 4 | 7 | 6 | 1 | 0 | 3 | 2 |
| CODEWORD | 16 | 17 | 18 | 19 | 20 | 21 | 22 | 23 | 24 | 25 | 26 | 27 | 28 | 29 | 30 | 31 |
| A0 | 4 | 5 | 6 | 7 | 0 | 1 | 2 | 3 | 3 | 2 | 1 | 0 | 7 | 6 | 5 | 4 |
| A1 | 3 | 2 | 1 | 0 | 7 | 6 | 5 | 4 | 6 | 7 | 4 | 5 | 2 | 3 | 0 | 1 |
| A2 | 6 | 7 | 4 | 5 | 2 | 3 | 0 | 1 | 7 | 6 | 5 | 4 | 3 | 2 | 1 | 0 |
| A3 | 7 | 6 | 5 | 4 | 3 | 2 | 1 | 0 | 5 | 4 | 7 | 6 | 1 | 0 | 3 | 2 |
| A4 | 5 | 4 | 7 | 6 | 1 | 0 | 3 | 2 | 1 | 0 | 3 | 2 | 5 | 4 | 7 | 6 |
| A5 | 1 | 0 | 3 | 2 | 5 | 4 | 7 | 6 | 2 | 3 | 0 | 1 | 6 | 7 | 4 | 5 |
| CODEWORD | 32 | 33 | 34 | 35 | 36 | 37 | 38 | 39 | 40 | 41 | 42 | 43 | 44 | 45 | 46 | 47 |
| A0 | 6 | 7 | 4 | 5 | 2 | 3 | 0 | 1 | 7 | 6 | 5 | 4 | 3 | 2 | 1 | 0 |
| A1 | 7 | 6 | 5 | 4 | 3 | 2 | 1 | 0 | 5 | 4 | 7 | 6 | 1 | 0 | 3 | 2 |
| A2 | 5 | 4 | 7 | 6 | 1 | 0 | 3 | 2 | 1 | 0 | 3 | 2 | 5 | 4 | 7 | 6 |
| A3 | 1 | 0 | 3 | 2 | 5 | 4 | 7 | 6 | 2 | 3 | 0 | 1 | 6 | 7 | 4 | 5 |
| A4 | 2 | 3 | 0 | 1 | 6 | 7 | 4 | 5 | 4 | 5 | 6 | 7 | 0 | 1 | 2 | 3 |
| A5 | 4 | 5 | 6 | 7 | 0 | 1 | 2 | 3 | 3 | 2 | 1 | 0 | 7 | 6 | 5 | 4 |
| CODEWORD | 48 | 49 | 50 | 51 | 52 | 53 | 54 | 55 | 56 | 57 | 58 | 59 | 60 | 61 | 62 | 63 |
| A0 | 5 | 4 | 7 | 6 | 1 | 0 | 3 | 2 | 1 | 0 | 3 | 2 | 5 | 4 | 7 | 6 |
| A1 | 1 | 0 | 3 | 2 | 5 | 4 | 7 | 6 | 2 | 3 | 0 | 1 | 6 | 7 | 4 | 5 |
| A2 | 2 | 3 | 0 | 1 | 6 | 7 | 4 | 5 | 4 | 5 | 6 | 7 | 0 | 1 | 2 | 3 |
| A3 | 4 | 5 | 6 | 7 | 0 | 1 | 2 | 3 | 3 | 2 | 1 | 0 | 7 | 6 | 5 | 4 |
| A4 | 3 | 2 | 1 | 0 | 7 | 6 | 5 | 4 | 6 | 7 | 4 | 5 | 2 | 3 | 0 | 1 |
| A5 | 6 | 7 | 4 | 5 | 2 | 3 | 0 | 1 | 7 | 6 | 5 | 4 | 3 | 2 | 1 | 0 |

FIG. 7

SYSTEM AND METHOD FOR TRANSMITTING UPLINK CONTROL INFORMATION IN AN OFDMA COMMUNICATION SYSTEM

PRIORITY

This application claims priority under 35 U.S.C. § 119 to an application entitled "System and Method for Transmitting Uplink Control Information in an OFDMA Communication System" filed in the Korean Intellectual Property Office on Jul. 1, 2004 and assigned Serial No. 2004-51315, the contents of which are incorporated herein by reference.

BACKGROUND OF THE INVENTION

1. Field of the Invention

The present invention relates generally to a system and method for transmitting control information in a mobile communication system, and in particular, to a system and method for transmitting uplink control information for performing fast cell switching in a communication system using an Orthogonal Frequency Division Multiple Access (OFDMA) scheme.

2. Description of the Related Art

Mobile communication systems, originally developed to provide a voice service, are evolving into advanced systems capable of providing various multimedia services. The mobile communication systems are evolving into a $4^{th}$ generation (4G) mobile communication system supporting high-speed multimedia services, following a $1^{st}$ generation (1G) analog system, a $2^{nd}$ generation (2G) digital system, and a $3^{rd}$ generation (3G) IMT-2000 system that supports a high-speed multimedia service. In the 4G mobile communication system, a user can access a satellite network, a local area network (LAN), and an Internet network with one terminal, for example, one mobile station (MS). That is, the user can enjoy many kinds of services, such as voice, image, multimedia, Internet data, voice mail, and instant message services, with one mobile terminal.

The 4G mobile communication system aims at a data rate of 20 Mbps for a super high-speed multimedia service, and commonly uses an Orthogonal Frequency Division Multiplexing (OFDM) scheme.

The OFDM scheme, a digital modulation scheme for multiplexing multiple orthogonal carrier signals, divides a single data stream into several low-speed streams and simultaneously transmits the low-speed streams using several subcarriers with a low data rate.

A multiple access scheme based on the OFDM scheme is known as an Orthogonal Frequency Division Multiple Access (OFDMA) scheme. In the OFDMA scheme, subcarriers in one OFDM symbol are shared by a plurality of users, i.e. MSs. A communication system based on the OFDMA scheme (hereinafter referred to as an "OFDMA communication system") has separate physical channels for transmitting uplink fast feedback information, which is a typical type of uplink control information.

The uplink fast feedback information includes full Signal-to-Noise Ratio (SNR) information, per-band differential SNR information, fast Multiple Input Multiple Output (MIMO) feedback information, and mode selection feedback information.

The uplink fast feedback information does not transmit large amounts of data as compared to the overall communication services. However, because the uplink fast feedback information is very important information for the communication system, highly reliable transmission should be guaranteed for the uplink fast feedback information. However, it is common that only a few of the frequency-time resources are allocated to physical channels, for example, fast feedback channels, used for transmitting the uplink fast feedback information, in order to reduce an overhead rate.

Generally, a combined method using a binary channel code and coherent modulation or differential modulation is used to transmit uplink control information. However, when the uplink control information is transmitted using less frequency-time resources then optimally required, an error rate increases, thereby decreasing operation stability of the communication system. While there are sufficient pilot tones for the transmission of downlink or uplink traffic, there are insufficient traffic tones for transmission of uplink control information. The lack of pilot tones deteriorates the channel estimation performance, thereby degrading the performance of a coherent modulation/demodulation scheme. If the number of pilot tones is increased taking into consideration only the channel estimation performance, the number of data tones becomes insufficient. In addition, separation of the binary channel code and the modulation causes some of the failures in performance. Further, if many of the frequency-time resources are used for transmitting the uplink control information, for example, uplink fast feedback information, in order to increase the stability, the overhead rate increases, which reduces throughput of the communication system.

The conventional method of transmitting uplink fast feedback information uses one uplink subchannel and transmits 4-bit information. However, the 4-bit information transmission cannot guarantee sufficient accuracy for the transmission of a full SNR and can transmit per-band differential SNRs only for 4 bands. In addition, the 4-bit information transmission lacks operation flexibility, so that is difficult to freely allocate codewords for the transmission of other information, as there are no more than 16 codewords.

In the existing cellular mobile communication system using a Code Division Multiple Access (CDMA) scheme, a fast cell switching (FCS) scheme is used to improve system performance. In the fast cell switching scheme, an MS manages several base stations (BSs) or several sectors in its active set, selects the best BS/sector having the best link performance from among the BSs or the sectors included in the active set, and informs the selected BS/sector of its best link performance through a Walsh code, in a process referred to as a data rate control (DRC) cover. The DRC cover refers to a Walsh code uniquely allocated to each BS in an Evolution Data Optimized (EV-DO) system. An MS sends a DRC cover request to a BS having a desired data rate, for example, the best DRC value and link performance, through a separate DRC channel. Thereafter, the MS receives downlink data from the BS/sector having the best link performance, thereby improving downlink performance. The active set is defined as a set of BSs or sectors that currently provide radio channels for the transmission/reception of the data to the MS. That is, an MS creates an active set with BSs, downlink performances of which are greater than or equal to a predetermined level, and BSs in the active set receive a variety of unique information on the MS. The foregoing scheme enables an MS located in a cell boundary to obtain selection diversity gain.

There is difficulty in directly applying the fast cell switching method to the OFDMA communication scheme. The CDMA scheme identifies many users, or MSs, using the user-specific long codes last multiplied in a digital transmitter. Therefore, every BS/sector can receive the signals transmitted by the MSs. Further, in the CDMA scheme, each BS/sector multiplies the received signals by the user-specific long code, and thereafter, despreads the multiplication result with Walsh codes corresponding to the MSs to determine if it is selected by the MSs as the best BS/sector.

However, in the OFDMA communication scheme, each BS/sector allocates frequency-time resources to a plurality of MSs, and the MSs must transmit signals only through the allocated frequency-time resources. If every BS/sector allocates independent frequency-time resources to all of the MSs employing the fast cell switching, this will serve as heavy overhead. If the information on the best BS/sector is transmitted not through a physical channel but through an upper layer message, the cell switching speed decreases, causing a decrease in selection diversity gain and scheduling performance.

As an existing scheme for solving the problems, there has been proposed a scheme for allocating a fast feedback channel for the transmission of channel quality information (CQI) and a fast feedback channel for the transmission of best BS/sector information, to an MS desiring to perform the fast cell switching. However, the existing scheme is inefficient because the MS requires two fast feedback channels in order to perform the fast cell switching.

SUMMARY OF THE INVENTION

It is, therefore, an object of the present invention to provide a system and method capable of performing efficient fast cell switching in an Orthogonal Frequency Division Multiple Access (OFDMA) communication system.

It is another object of the present invention to provide a system and method for improving scheduling performance in an OFDMA communication system.

It is further another object of the present invention to provide a system and method capable of transmitting various uplink control information by increasing the number of codewords for fast feedback channels in an OFDMA communication system, thereby efficiently using frequency-time resources.

It is yet another object of the present invention to provide a system and method capable of transmitting various uplink control information by increasing the number of codewords used for one fast feedback channel and separately allocating the entire set of codewords according to the type of the control information in an OFDMA communication system.

It is still another object of the present invention to provide a fast cell switching scheme capable of efficiently transmitting best BS/sector information, channel quality information (CQI), and mode selection feedback information through one fast feedback channel in an OFDMA communication system.

It is still another object of the present invention to provide a system and method capable of transmitting best BS/sector information for fast cell switching with a codeword through a fast feedback channel in an OFDMA communication system.

It is still another object of the present invention to provide a system and method capable of transmitting best BS/sector information through a small number of fast feedback channels.

According to one aspect of the present invention, there is provided a method for transmitting uplink control information in a communication system using an orthogonal frequency division multiple access (OFDMA) scheme. The method includes selecting, by a mobile station (MS) a target anchor base station (BS) with which the MS desires to communicate through a fast feedback channel, and transmitting a codeword allocated to the selected target anchor BS to a current anchor BS; upon receiving the codeword, transmitting to the MS, by the anchor BS, fast feedback channel allocation information for the selected BS corresponding to the received codeword; and switching, by the MS, to a new anchor BS corresponding to the fast feedback channel allocation information.

According to another aspect of the present invention, there is provided a method for transmitting uplink control information in an orthogonal frequency division multiple access (OFDMA) communication system. The method includes dividing all possible codewords into codeword groups each having a number of codewords and allocating the codeword groups for transmission of the uplink control information; and transmitting through a fast feedback channel codewords for which the uplink control information are allocated.

According to further another aspect of the present invention, there is provided a method for transmitting uplink control information in a communication system using an orthogonal frequency division multiple access (OFDMA) scheme. The method includes generating at least one type of uplink control information to be transmitted; dividing all possible codewords into a number of codeword groups each of which is mapped to an associated type of uplink control information, for transmission of the generated uplink control information; and orthogonal-modulating uplink control information to which the codewords are allocated, and allocating a codeword group for transmission of the modulated uplink control information.

According to still another aspect of the present invention, there is provided a method for supporting fast cell switching in a communication system including a mobile station (MS), an anchor base station (BS) currently in communication with the MS, and a target anchor BS which the MS selects for communication. The method includes transmitting through a fast feedback channel, by the anchor BS, information on a BS included in an active set; and comparing, by the MS, strengths of signals received from BSs included in the active set to select a target anchor BS having the best link performance, and transmitting to the anchor BS a codeword corresponding to the selected target BS.

According to still another aspect of the present invention, there is provided a method for allocating a fast feedback channel for fast cell switching in a communication system including a mobile station (MS), a current anchor base station (BS) currently in communication with the MS, and a target anchor BS which the MS selects for communication. The method includes selecting, by the MS, a target anchor BS having the best link performance among at least one BS included in an active set; transmitting a codeword allocated to the target anchor BS to the current anchor BS through a fast feedback channel; and if the codeword for the fast feedback channel received from the MS is a codeword allocated for the transmission of BS information, updating, by the current anchor BS, the anchor BS as the target anchor BS for fast cell switching of the MS.

According to still another aspect of the present invention, there is provided a system for transmitting uplink control information in a communication system using an orthogonal frequency division multiple access (OFDMA) scheme. The system includes a mobile station (MS) for selecting a base station (BS) having the best reception signal from among BSs included in an active set, allocating codewords in a first group from among all possible codewords for the transmission of channel quality information received from the selected BS to the current anchor BS through a fast feedback channel, allocating codewords in a second group for the transmission of BS/sector information for the selected BS, and allocating codewords in a third group for the transmission of mode selection feedback information; and an anchor BS for updating the anchor BS as the target anchor BS for fast cell switching of the MS if a codeword for a fast feedback channel received from the MS corresponds to a codeword allocated for transmission of BS information.

BRIEF DESCRIPTION OF THE DRAWINGS

The above and other objects, features and advantages of the present invention will become more apparent from the following detailed description when taken in conjunction with the accompanying drawings in which:

FIG. 6 is a diagram illustrating 32 possible codewords output from an 8-ary channel encoder according to an embodiment of the present invention; and FIG. 7 is a diagram illustrating 64 possible codewords output from an 8-ary channel encoder according to an embodiment of the present invention.

DETAILED DESCRIPTION OF THE PREFERRED EMBODIMENT

Several preferred embodiments of the present invention will now be described in detail with reference to the annexed drawings. In the following description, a detailed description of known functions and configurations incorporated herein has been omitted for conciseness.

The present invention proposes a scheme for transmitting various uplink control information in an Orthogonal Frequency Division Multiple Access (OFDMA) communication system. In addition, the present invention increases the number of codewords available for fast feedback channels, for transmission of the various uplink control information, thereby efficiently using frequency-time resources.

The present invention provides a method for identifying codewords for the transmission of channel quality information (CQI), codewords for the transmission of best base station (BS)/sector information, and codewords for the transmission of mode selection feedback information by increasing the number of codes used for one fast feedback channel. That is, the present invention proposes a fast cell switching scheme capable of solving the problems of the prior art and increasing efficiency of frequency-time resources using the novel method.

As described above, the present invention proposes a method capable of transmitting various uplink control information by increasing the number of codewords used for one fast feedback channel and separately allocating the entire set of codewords according to the type of control information. In particular, the present invention proposes a system and method capable of transmitting not only the existing CQI and mode selection feedback information but also best BS/sector information for fast cell switching through one fast feedback channel.

The present invention proposes a system and method capable of ensuring efficient fast cell switching, improving scheduling performance therethrough, and transmitting best BS/sector information through a small number of fast feedback channels in an OFDMA communication system.

The present invention proposes a scheme for efficiently transmitting best BS/sector information, CQI, and mode selection feedback information for fast cell switching in an OFDMA communication system.

Although various embodiments of the present invention will be described herein with reference to an OFDMA communication system, the present invention is not limited to the OFDMA communication system and can be applied to all of the communication systems that use a multiple access scheme.

Before a description of the present invention will be given, the conventional fast cell switching concept will be described herein below with reference to FIG. 1.

Figure 1:
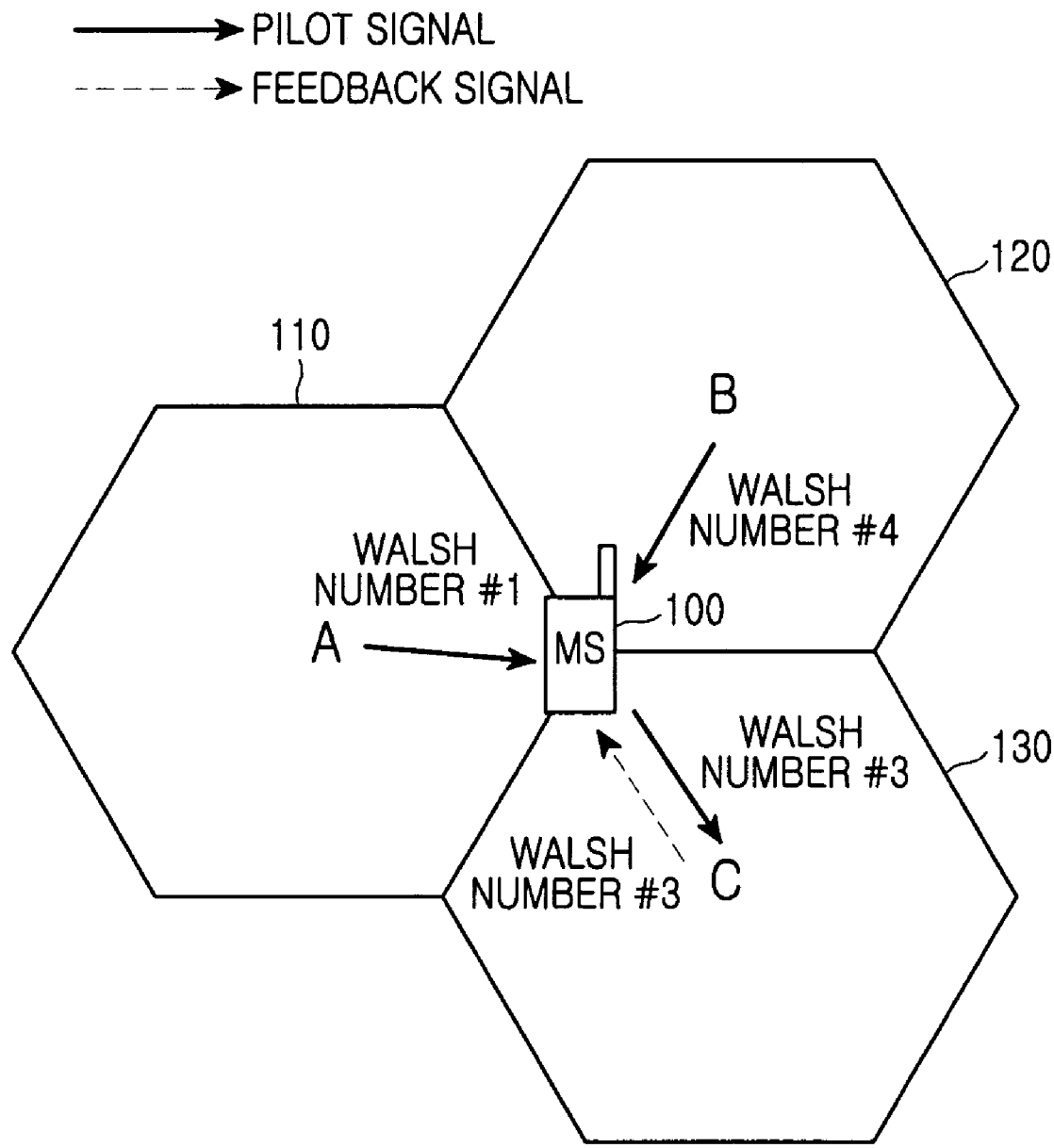
FIG. 1 is a diagram of fast cell switching in a general CDMA communication system.

FIG. 1 is a diagram of fast cell switching in a general CDMA communication system. Referring to FIG. 1, an active set of a mobile station (MS) 100 includes 3 BSs/sectors of, for example, a BS/sector_A 110, a BS/sector_B 120, and a BS/sector_C 130.

In the CDMA mobile communication system, the MS 100 is allocated separate Walsh codes from the BSs/sectors 110 to 130. Because the length of the Walsh codes is 8 in the case of a 1× Evolution Data Optimized (EV-DO) system, possible Walsh code numbers are 0 to 7. In the example of FIG. 1, the BS/sector_A 110 is allocated a Walsh code #1, the BS/sector_B 120 is allocated a Walsh code #4, and the BS/sector_C 130 is allocated a Walsh code #3.

The MS 100 compares the strengths of the pilot signals received from the 3 BSs/sectors 110 to 130, selects a BS/sector having the best link performance according to the comparison result, and provides the information to the selected BS/sector, so that the corresponding BS/sector can be informed that its own link performance is most superior.

In FIG. 1, if the signal received from the BS/sector_C 130 has the highest strength, the MS 100 transmits uplink data using a Walsh code #3 as a data rate control (DRC) cover. In the CDMA system, because an MS identifies its BS using unique Walsh codes of BSs, Walsh codes allocated from the 3 BSs/sectors 110 to 130 should have different Walsh code numbers. That is, in the general CDMA scheme, because MSs are identified using a user-specific long code, every BS/sector can receive the signals transmitted by the MSs. Further, in the CDMA scheme, each BS/sector multiplies the received signals by the user-specific long code, and thereafter, despreads the multiplication result with Walsh codes corresponding to the MSs to determine if it is selected by the MSs as the best BS/sector.

However, in the OFDMA communication system, each BS/sector allocates frequency-time resources to a plurality of MSs, and the MSs must transmit signals only through the allocated frequency-time resources. If every BS/sector allocates independent frequency-time resources to all of MSs employing the fast cell switching, an overhead problem occurs. That is, the conventional technology cannot directly apply the fast cell switching scheme to the OFDMA communication system.

Figure 2:
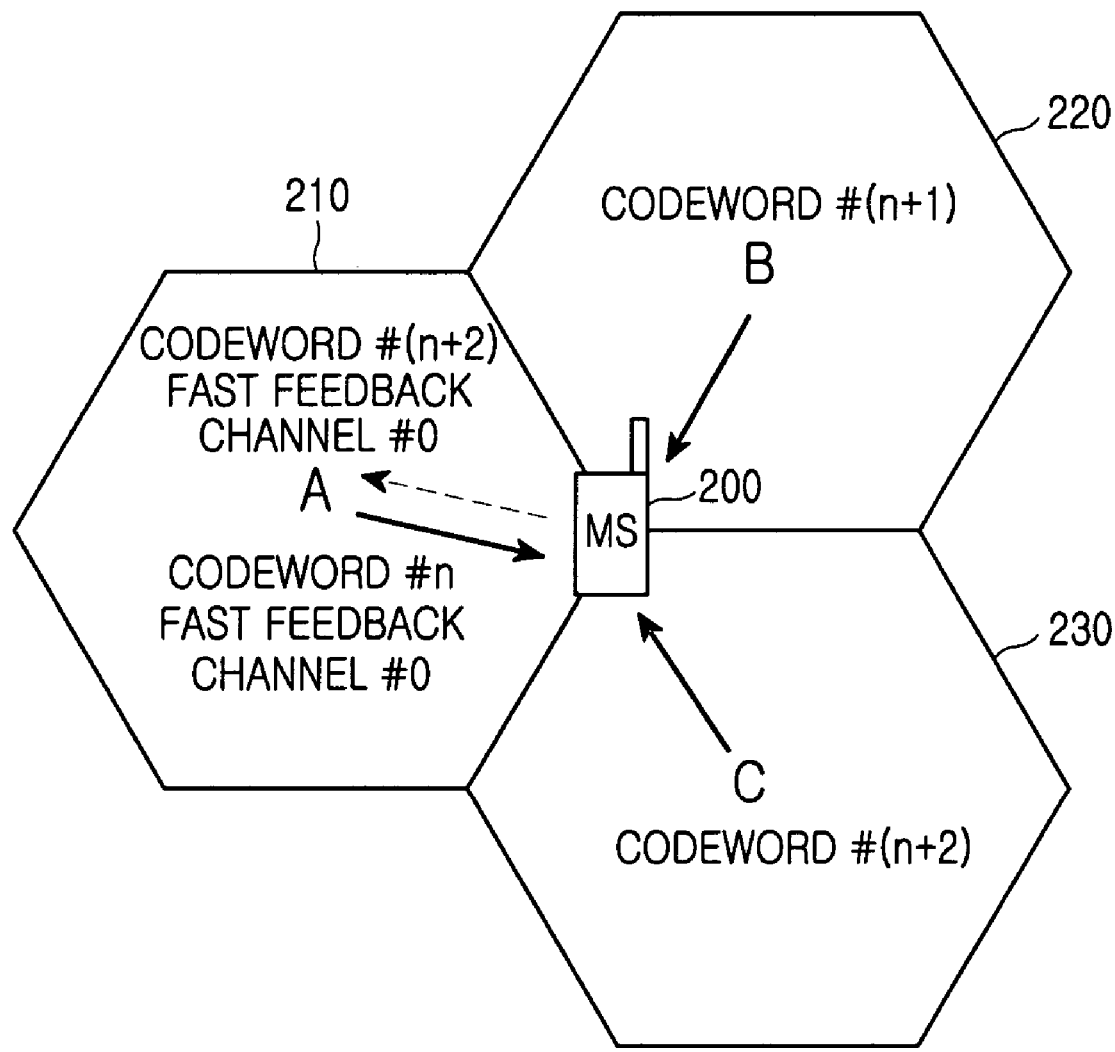
FIG. 2 is a diagram of fast cell switching in an OFDMA communication system according to an embodiment of the present invention.

FIG. 2 is a diagram illustrating of fast cell switching in an OFDMA communication system according to an embodiment of the present invention. In particular, FIG. 2 illustrates a novel fast cell switching concept for the transmission of uplink control information such as best BS/sector information, CQI, and mode selection feedback information according to an embodiment of the present invention.

Referring to FIG. 2, an active set of an MS 200 includes 3 BSs/sectors of, for example, a BS/sector_A 210, a BS/sector_B 220, and a BS/sector_C 230. It should be noted herein that the BS/sector represents one or both of a BS and a sector. For convenience, the BS/sector will be referred to as "BS" or "BS/sector."

The BS/sector_A 210 represents an anchor BS that is currently in communication with the MS 200. The BS/sector_A 210, or the anchor BS, transmits BS/sector information through a fast feedback channel. In this case, the anchor BS 210 allocates a codeword corresponding to a BS/sector included in the active set from among N codewords available for the transmission of the BS/sector information through the fast feedback channel, and transmits the allocation information to the MS 200.

Then the MS 200 compares the strengths of the signals, for example, pilots or preambles, from the BSs/sectors included in the active set, selects a BS/sector, for example, the BS/sector_C 230, having the best link performance according to the comparison result, and updates the selected BS/sector as a new anchor BS. To update the anchor BS, the MS 200 informs the current (or old) anchor BS, for example, the BS/sector_A 210, of its change to the new anchor BS through predetermined information or messages. The process and information for the change in the anchor BS will be described later in detail.

Assume that a BS currently having the best link performance is the BS/sector_C 230, and the current anchor BS is the BS/sector_A 210. In this case, the MS 200 transmits a codeword #(n+2) allocated to the BS/sector_C 230, which is a target anchor BS, to the BS/sector_A 210, which is the current anchor BS, through a fast feedback channel for the current anchor BS. If the MS 200 transmits an anchor BS switching request signal through the fast feedback channel, the BS/sector_A 210 receiving the anchor BS switching request signal performs decoding on all of the codewords, and determines a codeword sent by the MS 200 through the decoding. To correctly transmit the best BS/sector information, the MS 200 can repeatedly transmit a codeword corresponding to the BS/sector_C 230, which is a selected anchor BS or a target anchor BS, i.e. a codeword #(n+2) shown in FIG. 2, a set number of times.

If the BS/sector_A 210, receiving the codeword #(n+2) corresponding to the new target anchor BS from the MS 200, receives a corresponding codeword, i.e. the codeword #(n+2) corresponding to the BS/sector_C 230, the BS/sector_A 210 can transmit an acknowledge (ACK) signal in response thereto in order to reduce the number of transmissions for the best BS/sector information required by the MS 200. If the codeword for the fast feedback channel received from the MS 200 belongs to the codeword allocated for the transmission of the best BS/sector information, the BS/sector_A 210 updates an anchor BS with a corresponding BS, i.e. the BS/sector_C 230, for fast cell switching of the MS 200. Then the MS 200 alternately transmits the best BS/sector information and the CQI information to the BS/sector_A 210, which is the current anchor BS, a set number of times K. For the transmission of the CQI information, a codeword allocated for the transmission of the CQI information from among the entire set of codewords is used.

Next, with reference to FIG. 2, a description will be made of a call processing process between an MS and a BS/sector through fast cell switching according to an embodiment of the present invention. For convenience, it will be assumed in the following description that the BS/sector is a BS.

If no active set (or active BS set) has been created or if an update of the active set is needed, an MS sends a request for creating the active set through a switching request signal or a switching request message to the current anchor BS. The switching request signal or the switching request message represents, for example, an MS handover request (MSHO-REQ) message. Then the current anchor BS allocates temporary BS identifiers TEMP_BS_ID #0 to #7 to the active BSs included in each active set to create the active set, and thereafter, sends a response message, for example, a BS handover response (BSHO-RSP) message, in response to the request message.

As the fast feedback channel is used for the fast cell switching, for high reliability, it is preferable to previously allocate a fast feedback channel to be used when the MS changes its connection to another anchor BS. The anchor BS can allocate a fast feedback channel to be used by the MS through the BSHO-RSP message.

Upon receiving the BSHO-RSP message transmitted from the anchor BS, the MS can issue a confirm signal or a cancel signal using a handover indication (HO-IND) message corresponding to the BSHO-RSP message.

When switching the anchor BS after the active set is secured, the MS transmits a codeword for a target anchor BS as an anchor BS switching indicator using the fast feedback channel. The MS can transmit CQI information to the corresponding anchor BS before and until the cell switching. Because the basic CQI information must be provided even during the cell switching, it is preferable to alternately transmit the indicator and the CQI for the cell switching period. Further, the number of transmissions for the indicator can be adjusted according to needed reliability.

If a codeword for the fast feedback channel received from the MS corresponds to a codeword allocated for best BS/sector information, the current anchor BS can perform a confirm process or cancel process by connecting with the target anchor BS via a backbone, for anchor BS updating.

After completion of the indicator transmission for the switching period, the MS can either immediately switch the anchor BS, or switch the anchor BS after analyzing an approval signal from the current anchor BS or the target anchor BS.

As a CQI transmission method of the MS, the following 3 methods can be used until the anchor BS is updated:
(1) CQI transmission for the current anchor BS;
(2) CQI transmission for the target anchor BS; or
(3) alternate CQI transmission for the current anchor BS and the target anchor BS The present invention can transmit CQI information with a selected one of the 3 methods. For higher reliability, it is preferable to select one of the second CQI transmission method and the third CQI transmission method.

Figure 3:
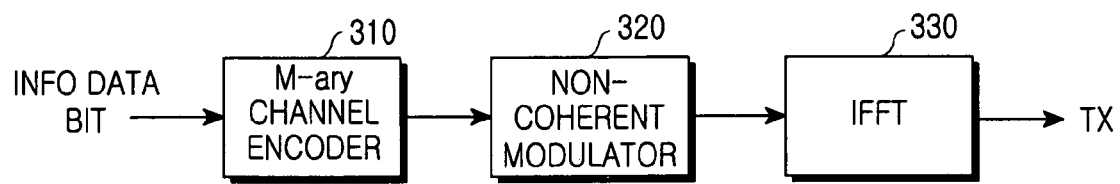
FIG. 3 is a diagram illustrating a transmitter for transmitting fast cell switching information in an OFDMA communication system according to an embodiment of the present invention.

FIG. 3 is a diagram illustrating a transmitter for transmitting fast cell switching information through a fast feedback channel in an OFDMA communication system according to an embodiment of the present invention. Specifically, FIG. 3 illustrates a structure of an MS transmitter for transmitting CQI, mode selection feedback information, and best BS/sector information for fast cell switching according to an embodiment of the present invention.

Referring to FIG. 3, a transmitter includes an M-ary channel encoder 310 for encoding information data bits for uplink control information, for example, uplink best BS/sector information for fast cell switching, a non-coherent modulator 320 for modulating the information data bits using a non-coherent modulation scheme, and an inverse fast Fourier transform (IFFT) block 330 for performing IFFT on a transmission signal before transmission.

If there are information data bits to be transmitted, for example, information data bits for CQI, mode selection feedback information, and best BS/sector information for fast cell switching, the M-ary channel encoder 310 encodes the information data bits into a codeword corresponding thereto, and outputs the codeword to the non-coherent modulator 320. The M-ary channel encoder 310 can include a binary channel encoder or an M-ary channel encoder that uses M-ary block codes, according to the number of input bits.

The non-coherent modulator 320 determines a transmission symbol corresponding to the codeword output from the M-ary channel encoder 310 using the non-coherent modulation scheme, and outputs the transmission symbol to the IFFT block 330. The non-coherent modulator 320 can use, for example, an orthogonal modulation scheme.

The IFFT block 330 performs IFFT on the transmission symbol output from the non-coherent modulator 320, and transmits the IFFT-processed transmission symbol.

In FIG. 3, the information data bits include the uplink best BS/sector information, CQI, and mode selection feedback information according to an embodiment of the present invention. The M-ary channel encoder 310 included in the transmitter encodes the received information data bits into coded symbols, and outputs the coded symbols to the non-coherent modulator 320. The non-coherent modulator 320 modulates the coded symbols, and outputs the modulated symbols to the IFFT block 330. The IFFT block 330 performs IFFT on the modulated symbols and transmits the IFFT-processed symbols. Because a succeeding structure of the transmitter is identical to that of the general radio frequency (RF) transmitter, it is now shown in FIG. 3 and a detailed description thereof will be omitted herein for simplicity.

Figure 4:
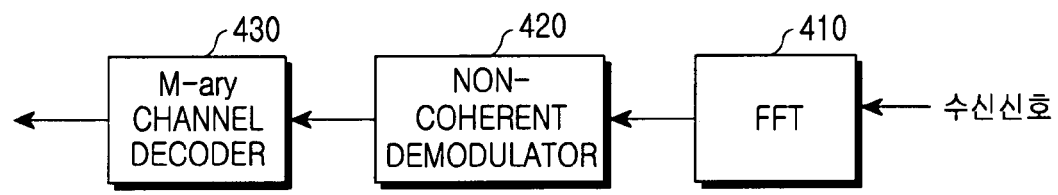
FIG. 4 is a diagram illustrating a receiver for receiving fast cell switching information in an OFDMA communication system according to an embodiment of the present invention.

FIG. 4 is a diagram illustrating a receiver for receiving fast cell switching information through a fast feedback channel in an OFDMA communication system according to an embodiment of the present invention. Specifically, FIG. 4 illustrates a structure of a BS receiver for receiving CQI, mode selection feedback information, and best BS/sector information for fast cell switching according to an embodiment of the present invention.

Referring to FIG. 4, a receiver includes a fast Fourier transform (FFT) block 410 for performing FFT on a time-domain received signal to convert the time-domain received signal into a frequency-domain received signal, a non-coherent demodulator 420 for demodulating the frequency-domain received signal, and an M-ary channel decoder 430 for decoding data bits for the uplink fast cell switching information from the demodulated received symbol.

Upon receiving a received signal from the transmitter, the FFT block 410 performs FFT on the received signal and outputs a received symbol to the non-coherent demodulator 420.

The non-coherent demodulator 420 receives the received symbol output from the FFT block 410, calculates a soft decision value thereof, for example, a square of an absolute value of a correlation value for the received symbol, using a non-coherent demodulation scheme, and outputs the soft decision value to the M-ary channel decoder 430.

The M-ary channel decoder 430 receives the soft decision value, for example, the square of the absolute value of the correlation value, from the non-coherent demodulator 420, determines which codeword was transmitted from the transmitter, and outputs data bits corresponding thereto. The data bits can be best BS/sector information. The M-ary channel decoder 430 can include a binary channel decoder or an M-ary channel decoder according to input bits.

The receiver corresponds to the transmitter of FIG. 3 in terms of the structure. A received signal can include the uplink best BS/sector information, CQI, and mode selection feedback information, which were transmitted from the transmitter using the OFDMA scheme. The receiver includes the FFT block 410, because a time-domain received signal is subject to IFFT before being transmitted in the transmitter. Also, in FIG. 4, a general structure of an RF receiver is not shown, and a detailed description thereof will be omitted herein for simplicity.

Figure 5:
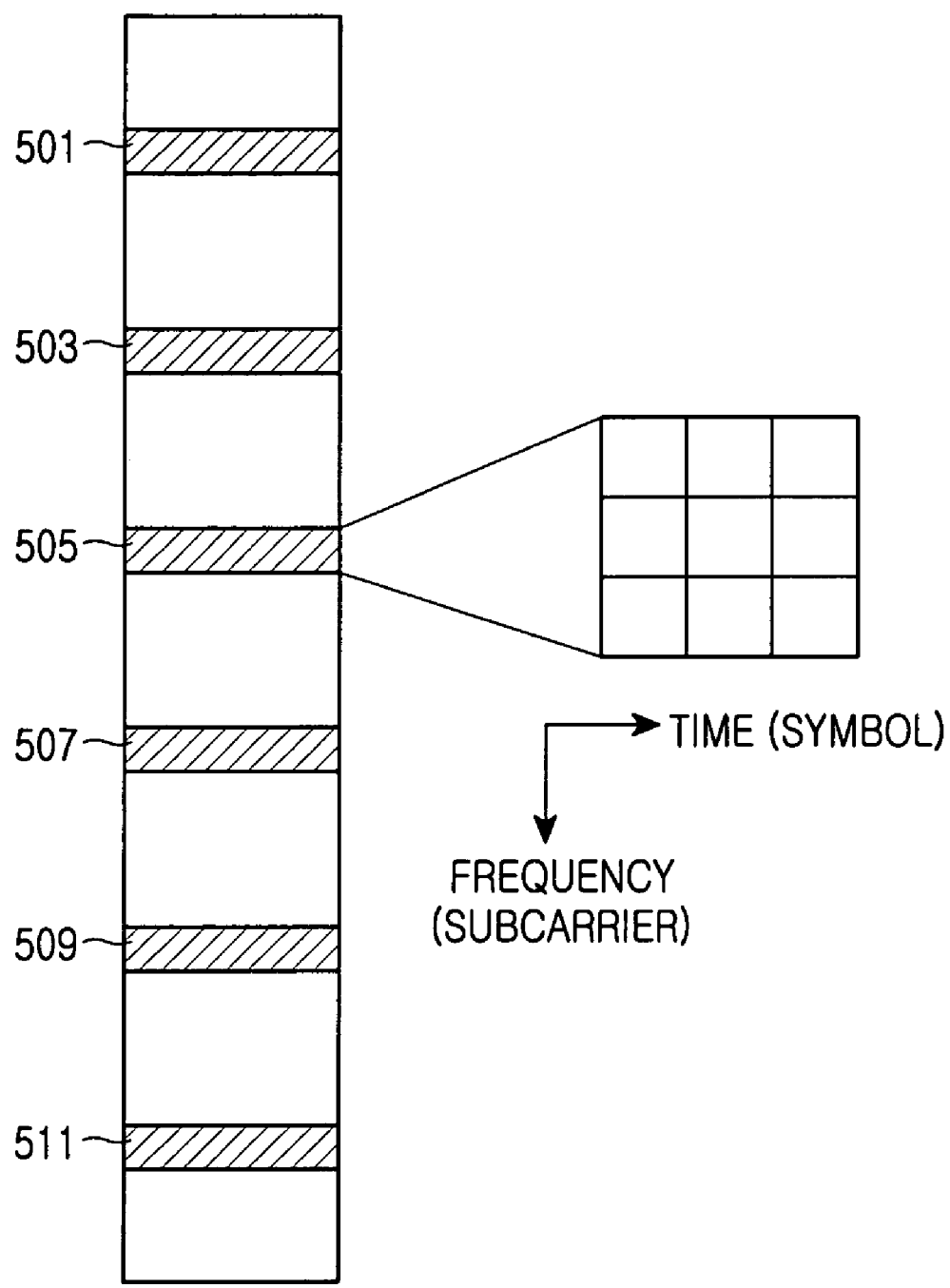
FIG. 5 a diagram illustrating frequency-time resources allocated for transmission of fast cell switching information in an OFDMA communication system according to an embodiment of the present invention.

With reference to FIGS. 5 to 7, a detailed description will now be made of a method for transmitting and receiving best BS/sector information, CQI, and mode selection feedback information, performed between the MS transmitter and the BS receiver.

It will be assumed herein that for the transmission of the best BS/sector information, CQI and mode selection feedback information, six 3×3 subcarrier tiles in a frequency-time domain are allocated in the uplink of an OFDMA communication system.

FIG. 5 a diagram illustrating frequency-time resources for the case where six 3×3 subcarrier tiles are allocated to a fast feedback channel for the transmission of uplink fast cell switching information in an OFDMA communication system according to an embodiment of the present invention.

Although an embodiment of the present invention will be described with reference to frequency-time resources for the case where six 3×3 subcarrier tiles are allocated for transmission of the best BS/sector information, CQI, and mode selection feedback information, the present invention is not restricted thereto. It is assumed in FIG. 5 that an M 8-ary channel encoder is used. In addition, it is assumed herein that each BS/sector uses one dedicated uplink subchannel for the best BS/sector. It is not necessary that the uplink subchannel be comprised of six 3×3 subcarrier tiles. In an alternative embodiment, the uplink subchannel can be comprised of six 4×3 subcarrier tiles. The present invention can also be applied to the other type of the uplink subchannel.

Referring to FIG. 5, hatched parts 501, 503, 505, 507, 509 and 511 represent uplink subcarrier tiles in a BS/sector according to an embodiment of the present invention, and each of the 6 tiles 501, 503, 505, 507, 509 and 511 forms one uplink subchannel and is used as a dedicated subchannel for the best BS/sector. Reference numeral 505 represents a 3×3 subcarrier tile in which the horizontal axis represents time or symbol and the vertical axis represents frequency or subcarrier. The embodiment of the present invention enables the transmission of various types of uplink control information by increasing the number of codewords for fast feedback channels, for the transmission of the best BS/sector information, CQI, and mode selection feedback information. A novel method for transmitting various uplink control information according to an embodiment of the present invention will be described with reference the case where there are 32 codewords and another case where there are 64 codewords. With reference to Table 1 below, a description will first be made of the mode selection feedback information according to an embodiment of the present invention. Next, with reference to Table 2 below, a description will be made of an exemplary method of allocating codewords depending on the uplink control information according to an embodiment of the present invention.

The mode selection feedback information according to an embodiment of the present invention is shown in Table 1.

TABLE 1

| Value | Description |
|---|---|
| 0b0000 | STTD and PUSC/FUSC permutation |
| 0b0001 | STTD and adjacent-subcarrier permutation |
| 0b0010 | SM and PUSC/FUSC permutation |
| 0b0011 | SM and adjacent-subcarrier permutation |
| 0b0100 | Closed-loop SM and PUSC/FUSC permutation |
| 0b0101 | Closed-loop SM and adjacent-subcarrier permutation |
| 0b0110 | Closed-loop SM + Beamforming and adjacent-subcarrier permutation |
| 0b1000–0b1111 | Reserved |

Table 1 shows an example of mode selection feedback information according to an embodiment of the present invention. The types of modes include a Multiple-Input Multiple-Output (MIMO) mode and a permutation mode, and the values of Table 1 are transmitted when the mode selection feedback information is transmitted over a fast feedback channel. The values of Table 1 are shown by way of example, and are subject to change according to system conditions.

Next, a description of an exemplary method of allocating codewords depending on the uplink control information is shown in Table 2.

TABLE 2

| Name | Type (1 byte) | Length | Value |
|---|---|---|---|
| Downlink CQI | aaa | 1 | Number of FAST FEEDBACK channel codewords for downlink SNR report. Possible values are 0~63. |
| Best BS/sector information | bbb | 1 | Number of FAST FEEDBACK channel codewords for preferred BS/sector report. Possible values are 0~63. |
| MIMO/Permutation mode selection feedback information | ccc | 1 | Number of FAST FEEDBACK channel codewords for MIMO mode and permutation mode selection. Possible values are 0~63. |

Table 2 shows an exemplary method of allocating codewords depending on the uplink control information according to an embodiment of the present invention. Each BS/sector informs an MS of an information table shown in Table 2 wherein for all of the codewords, L codewords (length information transmitted with aaa bits) are allocated for the transmission of the CQI information, M codewords (length information transmitted with bbb bits) are allocated for the transmission of the best BS/sector information, N codewords (length information transmitted with ccc bits) are allocated for the transmission of the MIMO/Permutation mode selection feedback information, and the remaining codewords are allocated for the transmission of the other control information.

The MS, if it desires to switch anchor BSs, transmits a codeword allocated to a new anchor BS, or a target anchor BS, to a current anchor BS through a fast feedback channel. The codeword is selected from the M codewords allocated for the transmission of the best BS/sector information in codeword allocation information received from the current anchor BS, i.e. the information table shown in Table 2.

If an anchor BS switching request of the MS is approved, the current anchor BS can either transmit fast feedback channel allocation information of the target anchor BS through a BS switching approval message (or BSHO-RSP message), or transmit the fast feedback channel allocation information through an anchor BS switching indicator indicating an anchor BS for an anchor BS switching period. Alternatively, after the completion of the switching, the current anchor BS can transmit the fast feedback channel allocation information through the entire channel allocation information (a broadcasting control message or a MAP message) provided from the target anchor BS to its MSs.

FIG. 6 is a diagram illustrating 32 possible codewords output from an 8-ary channel encoder according to an embodiment of the present invention. Referring to FIG. 6, in a transmitter, upon receiving information data bits, an 8-ary channel encoder outputs a selected one of the 32 possible codewords shown in FIG. 6 to a non-coherent modulator. The 8-ary channel encoder is designed such that a minimum Hamming distance between the codewords should be maximized, for the given number of codewords and for a given length. The "Hamming distance" refers to the number of distinct bits from among the corresponding bits between two codewords.

In this transmission method, the minimum Hamming distance, which is a major factor affecting the codeword error probability performance, is 5. That is, for example, for a codeword '16' among the 32 possible codewords, a pattern of the codeword indexes A0, A1, A2, A3, A4, and A5 for a subcarrier tile is '472516', and for a codeword '24', a pattern of the codeword indexes A0, A1, A2, A3, A4, and A5 for a subcarrier tile becomes '460257'. As a result, the minimum Hamming distance between the two codewords '16' and '24' becomes 5. The minimum Hamming distance=5 indicates that the minimum Hamming distance between two codewords is greater than or equal to 5, for all pairs of the possible codewords.

Referring to Table 2 and FIG. 6, among the 32 codewords shown in FIG. 6, L codewords can be allocated for the transmission of the CQI information, M codewords can be allocated for the transmission of best the BS/sector information, N codewords can be allocated for the transmission of the MIMO/Permutation mode selection feedback information, and the remaining codewords can be allocated for the transmission of the other control information. FIG. 6 is equal to Table 2 in terms of the values of L, M and N. An embodiment of the present invention will be described with reference to FIG. 6 and Table 2 wherein L=24, M=8 and N=0. In this case, because 24 codewords are allocated for the transmission of the CQI transmission, codeword allocation for a channel quality period can be defined as $$\text{Codeword Number} = \begin{cases} 0, & SNR \leq -4 \text{ dB} \\ n, & 1.5n - 5.5 < SNR \leq 1.5n - 4 \ (1 \leq n \leq 22) \\ 23, & SNR > 29 \text{ dB} \end{cases} \quad (1)$$

In addition, it can be understood that 8 codewords are allocated for the transmission of the best BS/sector information and no codeword is allocated for the transmission of the MIMO/Permutation mode selection feedback information and the other control information.

The present invention will be described with reference to another example in which L=16, M=8, N=8. In this case, because 16 codewords are allocated for the transmission of the CQI information, codeword allocation for a channel quality period can be defined as $$\text{Codeword Number} = \begin{cases} 0, & SNR \le -2 \text{ dB} \\ n, & 2n-4 < SNR \le 2n-2 \ (1 \le n \le 14) \\ 15, & SNR > 26 \text{ dB} \end{cases} \quad (2)$$

In addition, it can be understood that 8 codewords are allocated for the transmission of the best BS/sector information, 8 codewords are allocated for the transmission of the MIMO/Permutation mode selection feedback information, and no codeword is allocated for the other control information. In order to transmit the allocated codewords through a fast feedback channel, a non-coherent modulator uses an orthogonal modulation method for the codewords received from the 8-ary channel encoder. That is, the non-coherent modulator modulates information data bits encoded by the 8-ary channel encoder using the orthogonal modulation method. Orthogonal vectors used for the orthogonal modulation are shown in Table 3 below.

TABLE 3

| Vector index | Subcarrier modulation per codeword subcarrier 0, subcarrier 1, . . . , subcarrier 7 |
|---|---|
| 0 | P0, P1, P2, P3, P0, P1, P2, P3 |
| 1 | P0, P3, P2, P1, P0, P3, P2, P1 |
| 2 | P0, P0, P1, P1, P2, P2, P3, P3 |
| 3 | P0, P0, P3, P3, P2, P2, P1, P1 |
| 4 | P0, P0, P0, P0, P0, P0, P0, P0 |
| 5 | P0, P2, P0, P2, P0, P2, P0, P2 |
| 6 | P0, P2, P0, P2, P2, P0, P2, P0 |
| 7 | P0, P2, P2, P0, P2, P0, P0, P2 |

As shown in Table 3, the orthogonal vectors to be used for the orthogonal modulation can be represented by P0, P1, P2 and P3, and for Quadrature Phase Shift Keying (QPSK) modulation symbols by a QPSK modulation scheme, the orthogonal vectors can be defined as $$P0 = \exp\left(j \cdot \frac{\pi}{4}\right) \quad (3)$$
$$P1 = \exp\left(j \cdot \frac{3\pi}{4}\right)$$
$$P2 = \exp\left(-j \cdot \frac{3\pi}{4}\right)$$
$$P3 = \exp\left(-j \cdot \frac{\pi}{4}\right)$$

The 8 edge subcarriers of a 3×3 subcarrier tile transmit data symbols shown in Table 3, and the remaining one center subcarrier transmits a pilot symbol. The pilot symbol can be arbitrarily selected. For example, if 5-bit information data to be transmitted is given, a transmitter determines a codeword according to FIG. 6. Thereafter, the transmitter transmits an orthogonal vector for a pattern corresponding to a codeword index A0, i.e. an orthogonal vector for a corresponding vector index in a first 3×3 subcarrier tile; an orthogonal vector for a pattern corresponding to a codeword index A1, i.e. an orthogonal vector for a corresponding vector index in a second 3×3 subcarrier tile; and in the same manner, an orthogonal vector for a pattern corresponding to a codeword index A5, i.e. an orthogonal vector for a corresponding vector index in a sixth 3×3 subcarrier tile according to the determined codeword using the method of Table 3. More specifically, if a vector index for the first 3×3 subcarrier tile is 4, data symbol values are set to P0, P0, P0, P0, P0, P0, P0, P0 corresponding to a vector index 4. If a vector index for the second 3×3 subcarrier tile is 7, data symbol values are set to P0, P2, P2, P0, P2, P0, P0, P2 corresponding to a vector index 7. If a vector index for the third 3×3 subcarrier tile is 2, data symbol values are set to P0, P0, P1, P1, P2, P2, P3, P3 corresponding to a vector index 2. In a receiver, upon receiving a signal transmitted from the transmitter, an FFT block performs FFT on the received signal, and outputs the FFT-processed signal to a non-coherent demodulator. The non-coherent demodulator calculates a square of an absolute value of a correlation value for the 8 possible orthogonal vectors for each of the six 3×3 subcarrier tiles, and outputs the calculated signal to an M-ary channel decoder. The M-ary channel decoder calculates a sum of squares of absolute values for correlation values of orthogonal vectors corresponding to all of the 32 possible codewords, and then determines that the information data bits corresponding to a codeword having the maximum value from among the codewords was transmitted by the transmitter.

In this manner, the BS receiver can determine the type of the control information that the MS has transmitted, depending on the codeword transmitted from the MS transmitter. As described above, in this case, in order to reduce the number of transmission for the best BS/sector information required by the MS, if an anchor BS is switched, the BS can form an acknowledge (ACK) signal in the bitmap format in response thereto and transmit the ACK signal through a downlink (DL)-MAP. The foregoing transmission method has been described with reference to the case where the number of information data bits is 5. Next, the transmission method will be described for the case where the number of the information data bits is 6.

FIG. 7 is a diagram illustrating 64 possible codewords output from an 8-ary channel encoder according to an embodiment of the present invention. Referring to FIG. 7, in a transmitter, upon receiving information data bits, an 8-ary channel encoder outputs a selected one of the 64 possible codewords shown in FIG. 7 to a non-coherent modulator. It is noted that among the 64 codewords shown in FIG. 7, the first 32 codewords are equal to the codewords shown in FIG. 6. The 8-ary channel encoder is designed such that a minimum Hamming distance between the codewords should be maximized, for the given number of codewords and for a given length. The "Hamming distance" refers to the number of distinct bits among corresponding bits between two codewords.

In this transmission method, the minimum Hamming distance, which is a major factor affecting the codeword error probability performance, is 5. That is, for example, for a codeword '32' among the 64 possible codewords, a pattern of the codeword indexes A0, A1, A2, A3, A4, and A5 for a subcarrier tile is '675124', and for a codeword '40', a pattern of the codeword indexes A0, A1, A2, A3, A4, and A5 for a subcarrier tile becomes '751243'. As a result, the minimum Hamming distance between the two codewords '32' and '40' becomes 5. The minimum Hamming distance=5 indicates that the minimum Hamming distance between two codewords is greater than or equal to 5, for all pairs of the possible codewords.

Alternatively, this method can transmit 5 bits using only 32 codewords as described with reference to FIG. 6.

Referring to Table 2 and FIG. 7, among the 64 codewords shown in FIG. 7, L codewords can be allocated for the transmission of the CQI information, M codewords can be allocated for the transmission of the best BS/sector information, N codewords can be allocated for the transmission of the MIMO/Permutation mode selection feedback information, and the remaining codewords can be allocated for the transmission of the other control information. Herein, FIG. 7 is equal to Table 2 in terms of the values of L, M and N.

An embodiment of the present invention will be described with reference to FIG. 7 and Table 2 wherein L=32, M=8 and N=8. It is assumed herein that the remaining 16 codewords among the 64 possible codewords are used. In this case, because 32 codewords are allocated for the transmission of the CQI transmission, the codeword allocation for a channel quality period can be defined as Equation (4) from a codeword #0 of '000000' to a codeword #31 of '011111'.

$$\text{Codeword Number} = \begin{cases} 0, & SNR \leq -3 \text{ dB} \\ n, & n-4 < SNR \leq n-3 \ (1 \leq n \leq 30) \\ 31, & SNR > 27 \text{ dB} \end{cases} \quad (4)$$

In addition, because 8 codewords are allocated for the transmission of the best BS/sector information, a codeword #32 of '100000' can be allocated for a BS#0 included in an active set, a codeword #33 of '100001' can be allocated for a BS#1 included in the active set, and in the same manner, a codeword #38 of '100111' can be allocated for a BS#7 included in the active set. If a target anchor BS is a BS#1 among the BSs included in the active set, the MS transmits a codeword #33 through a fast feedback channel for the current anchor BS.

Because 8 codewords are allocated for the transmission of the MIMO/Permutation mode selection feedback information, a codeword #39 of '101000' to a codeword #46 of '101111' are allocated for the mode selection feedback information.

Next, in order to transmit the allocated codewords through a fast feedback channel, a non-coherent modulator uses an orthogonal modulation method for the codewords received from the 8-ary channel encoder. That is, the non-coherent modulator modulates the information data bits encoded by the 8-ary channel encoder using the orthogonal modulation method. Orthogonal vectors used for the orthogonal modulation are shown in Table 3.

The 8 edge subcarriers of a 3×3 subcarrier tile transmit the data symbols shown in Table 3, and the remaining one center subcarrier transmits a pilot symbol. The pilot symbol can be arbitrarily selected. Values of the transmitted data symbols are set to the orthogonal vectors corresponding to their associated vector indexes as shown in Table 3. The process of setting the orthogonal vectors has been described above. More specifically, if 6-bit information data to be transmitted is given, a transmitter determines the codewords according to FIG. 7. Thereafter, the transmitter transmits an orthogonal vector for a vector index corresponding to a codeword index A0 in a first 3×3 subcarrier tile, transmits an orthogonal vector for a vector index corresponding to a codeword index A1 in a second 3×3 subcarrier tile, and finally, transmits an orthogonal vector for a vector index corresponding to a codeword index A5 in a sixth 3×3 subcarrier tile, using the method shown of Table 3. In a receiver, upon receiving a signal transmitted from the transmitter, an FFT block performs FFT on the received signal, and outputs the FFT-processed signal to a non-coherent demodulator. The non-coherent demodulator calculates a square of an absolute value of a correlation value for the 8 possible orthogonal vectors for each of the six 3×3 subcarrier tiles, and outputs the calculated signal to an M-ary channel decoder. The M-ary channel decoder calculates a sum of the squares of the absolute values for the correlation values of the orthogonal vectors corresponding to all of the 64 possible codewords, and then determines if the information data bits corresponding to a codeword having the maximum value among the codewords was transmitted by the transmitter.

In this manner, the BS receiver can determine the type of the control information that the MS has transmitted, depending on the codeword transmitted from the MS transmitter. As described above, in this case, in order to reduce the number of transmission occurrences for the best BS/sector information required by the MS, if an anchor BS is switched, the BS can form an ACK signal in the bitmap format in response thereto and transmit the ACK signal through a DL-MAP.

The foregoing transmission method has been described with reference to the case where each 3×3 subcarrier tile for uplink is comprised of 1 pilot symbol and 8 data symbols, by way of example. However, the present invention is not restricted thereto. For example, Partial Usage Sub-Channel (PUSC) uses 4×3 subcarrier tiles for the uplink, each of which is comprised of 4 pilot symbols and 8 data symbols. The present invention can also be applied to the PUSC and other subchannel formats.

As described above, the novel method increases the number of codewords used for one fast feedback channel in an OFDMA communication system, thereby making it possible to divide the codewords into codewords for the transmission of the CQI information, codewords for the transmission of the best BS/sector information, and codewords for the transmission of the mode selection feedback information. In this manner, the novel method enables fast cell switching and increases efficiency of frequency-time resources.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. A method for transmitting uplink control information in a communication system using an orthogonal frequency division multiple access (OFDMA) scheme, the method comprising the steps of:

determining by a mobile station (MS) a target anchor base station (BS) with which the MS desires to communicate from among an active set of the MS that is communicating with a current anchor BS;

dividing all codewords in the system into a plurality of codeword groups;

selecting a codeword corresponding to the target anchor BS from among the codewords for a fast feedback channel and transmitting, to the current anchor BS, the selected codeword fin requesting a fast cell switching through the fast feedback channel, wherein a first codeword group of the plurality of codeword groups is allocated for identifying at least one anchor BS included in the active set, a second codeword group of the plurality of codeword groups is allocated for transmitting channel quality information, and a third codeword group of the plurality of codeword groups is allocated for transmitting multiple input multiple output (MIMO) mode selection feedback information;

receiving a response for the fast cell switching from the current anchor BS in response to the transmitted codeword; and switching the target anchor BS to a new anchor BS of the MS according to the response, wherein codewords of the first codeword group are sequentially allocated to at least one anchor BS included in the active set.

2. The method of claim 1, wherein the codeword corresponding to the target anchor BS is selected from codeword allocation information received from the current anchor BS.

3. A method for performing fast cell switching in a communication system using an orthogonal frequency division multiple access (OFDMA) scheme, the method comprising the steps of:
dividing all codewords in the system into a plurality of codeword groups;
receiving, from a mobile station (MS), a codeword corresponding to a target anchor BS selected from among the codewords for a fast feedback channel, wherein a first codeword group of the plurality of codeword groups is allocated for identifying at least one anchor BS included in the active set, a second codeword group of the plurality of codeword groups is allocated for transmitting channel quality information, and a third codeword group of the plurality of codeword groups is allocated for transmitting multiple input multiple output (MIMO) mode selection feedback information;
transmitting a response for the fast cell switching to the MS in response to the received codeword; and
switching the target anchor BS to a new anchor BS of the MS according to the fast feedback channel allocation information,
wherein codewords of the first codeword group are sequentially allocated to at least one anchor BS included in the active set.

4. The method of claim 3, further comprising the step of:
receiving channel quality information of the target anchor BS through the fast feedback channel using at least one codeword of the second codeword group, after repeatedly receiving the codeword.

5. The method of claim 3, wherein the codeword corresponding to the target anchor BS is received though a switching request message, when there is a need for updating the active set.

6. The method of claim 3, further comprising the step of:
creating a new active set of the MS by allocating temporary BS identifiers (IDs) to BSs included in the new active set, when the codeword corresponding to the target anchor BS is received.

7. The method of claim 3, wherein the switching step comprises the steps of:
receiving, from the MS, the codeword corresponding to the target anchor BS and channel quality information of the target anchor BS alternately and repeatedly for a switching period; and
after the reception of the codeword and the channel quality information for the switching period, immediately switching the target anchor BS to the new anchor BS of the MS.

8. A system for transmitting uplink control information in a communication system using an orthogonal frequency division multiple access (OFDMA) scheme, wherein all codewords in the system are divided into a plurality of codeword groups, the system comprising:
a mobile station (MS) for determining a target anchor base station (BS) with which the MS desires to communicate from among an active set of the MS, selecting a codeword corresponding to the target anchor BS from among the codewords for a fast feedback channel and transmitting the selected codeword for requesting a fast cell switching through the fast feedback channel, wherein a first codeword group of the plurality of codeword groups is allocated for identifying at least one anchor BS included in the active set, a second codeword group of the plurality of codeword groups is allocated for transmitting channel quality information, and a third codeword group of the plurality of codeword groups is allocated for transmitting multiple input multiple output (MIMO) mode selection feedback information; and
a current anchor BS communicating with the MS, for transmitting a response for the fast cell switching to the MS in response to the received codeword so that the MS switches the target anchor BS to a new anchor BS of the MS according to the fast feedback channel allocation information,
wherein codewords of the first codeword group are sequentially allocated to at least one anchor BS included in the active set.

9. The system of claim 8, wherein the MS repeatedly transmits the codeword corresponding to the target anchor BS a predetermined number of times, and transmits channel quality information of the target anchor BS through the fast feedback channel using at least one codeword of the second codeword group, after repeatedly transmitting the codeword.

10. The system of claim 8, wherein when there is a need for updating the active set, the MS transmits the codeword corresponding to the target answer BS through a switching request message.

11. The system of claim 8, wherein the current anchor BS creates a new active set of the MS by allocating temporary BS identifiers (IDs) to BSs included in the new active set, when the codeword corresponding to the target anchor BS is received.

12. The system of claim 8, wherein the MS transmits the codeword corresponding to the target anchor BS and channel quality information of the target anchor BS alternately and repeatedly for a switching period, and immediately switches the target anchor BS to the new anchor BS of the MS, after the reception of the codeword and the channel quality information for the switching period.

13. The method of claim 1, further comprising:
transmitting channel quality information of the target anchor BS through the that feedback channel using at least one codeword of the second codeword group, after repeatedly transmitting the codeword corresponding to the target anchor BS a predetermined number of times.

14. The method of claim 1, wherein the codeword corresponding to the target anchor BS is transmitted through a switching request message, when there is a need for updating the active set.

15. The method of claim 1, wherein the current anchor BS creates a new active set of the MS by allocating temporary BS identifiers (IDs) to BSs included in the new active set, when the codeword corresponding to the target anchor BS is received.

16. The method of claim 1, wherein the switching step comprises:
transmitting the codeword corresponding to the target anchor BS and channel quality information of the target anchor BS alternately and repeatedly for a switching period; and
immediately switching the target anchor BS to the new anchor BS of the MS, after the reception of the codeword and the channel quality information for the switching period.

* * * * *